(12) United States Patent
Murakami

(10) Patent No.: US 10,137,523 B2
(45) Date of Patent: Nov. 27, 2018

(54) RESISTANCE WELDING METHOD AND CONDUCTOR UNIT

(75) Inventor: Kazuhiro Murakami, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 679 days.

(21) Appl. No.: 12/073,534

(22) Filed: Mar. 6, 2008

(65) Prior Publication Data

US 2008/0156776 A1    Jul. 3, 2008

(51) Int. Cl.
   *B23K 11/16* (2006.01)
   *B23K 11/00* (2006.01)

(52) U.S. Cl.
   CPC .......... *B23K 11/002* (2013.01); *B23K 11/163* (2013.01)

(58) Field of Classification Search
   CPC ...... B23H 7/101; B23H 7/102; B23K 11/002; B23K 11/20; B23K 11/3009; B23K 2201/26; B23K 11/008; C21D 1/40; B21F 27/10
   USPC ........ 219/55, 50, 56, 56.22, 119, 117.1, 118, 219/615
   See application file for complete search history.

(56) References Cited

U.S. PATENT DOCUMENTS

| | | | | |
|---|---|---|---|---|
| 1,695,791 A | * | 12/1928 | Yunck | 313/317 |
| 2,735,163 A | * | 2/1956 | Brooks et al. | 428/646 |
| 2,841,546 A | * | 7/1958 | Robinson | 204/196.24 |
| 2,880,304 A | * | 3/1959 | Campbell | 219/107 |
| 2,918,722 A | * | 12/1959 | Kenmore | 428/658 |
| 3,443,053 A | | 5/1969 | Luetzow | |
| 3,555,240 A | * | 1/1971 | Gloor et al. | 219/145.23 |
| 3,591,754 A | * | 7/1971 | Baldwin, Jr. | 219/50 |
| 3,592,993 A | * | 7/1971 | Bennett | 219/83 |
| 3,742,588 A | * | 7/1973 | George | 29/458 |
| 3,841,127 A | * | 10/1974 | Pashak | 72/47 |
| 3,992,602 A | * | 11/1976 | Ashton | 219/78.14 |

(Continued)

FOREIGN PATENT DOCUMENTS

DE     30 15 896     11/1980
DE    195 14 687    10/1995
(Continued)

OTHER PUBLICATIONS

Pfeifer, L., "Technical knowledge of resistance welding," Essen: Girardet, 1969, pp. 13-20.

(Continued)

*Primary Examiner* — Jimmy Chou
(74) *Attorney, Agent, or Firm* — Locke Lord LLP; James E. Armstrong, IV; Nicholas J. DiCeglie, Jr.

(57) ABSTRACT

The resistance welding method of welding two objects together includes the steps of: clamping the objects between a pair of electrodes; and applying a current between the electrodes while the objects are pressed to bring them close to each other to allow a contacting surface between them to generate heat. One object includes a core member and a plated layer coating the core member and having a melting point lower than that of a metal constituting an outer surface of the core member. The objects are clamped between the electrodes and the contacting surface are allowed to generate heat to melt the plated layer to weld the outer surface of the core member of the one object and a base member of another object together. At least the outer surface of the core member and the base member are made of respective metals, between which no intermetallic compound is formed.

3 Claims, 7 Drawing Sheets

(56) References Cited

U.S. PATENT DOCUMENTS

| | | | |
|---|---|---|---|
| 4,135,075 A * | 1/1979 | Heflin | 219/78.14 |
| 4,203,020 A * | 5/1980 | Armbruster et al. | 219/93 |
| 4,341,939 A * | 7/1982 | Briffod et al. | 219/69.12 |
| 4,400,608 A * | 8/1983 | Wagatsuma et al. | 219/107 |
| 4,650,951 A * | 3/1987 | Koga et al. | 219/118 |
| 4,686,153 A * | 8/1987 | Tominaga et al. | 428/610 |
| 4,717,804 A * | 1/1988 | Tomalin | 219/69.12 |
| 4,740,666 A * | 4/1988 | Tomalin et al. | 219/69.12 |
| 4,837,416 A * | 6/1989 | Yamamoto et al. | 219/69.12 |
| 4,935,594 A * | 6/1990 | Groos et al. | 219/69.12 |
| 4,968,867 A * | 11/1990 | Banzai et al. | 219/69.12 |
| 4,988,552 A * | 1/1991 | Tomalin | 428/677 |
| 5,231,270 A * | 7/1993 | Groos et al. | 219/69.12 |
| 5,387,774 A * | 2/1995 | Boyer et al. | 219/86.33 |
| 5,389,761 A * | 2/1995 | Kresse, Jr. | 219/78.14 |
| 5,504,296 A * | 4/1996 | Sato et al. | 219/85.1 |
| 5,587,091 A | 12/1996 | Kawagoe et al. | |
| 5,688,426 A * | 11/1997 | Kirkwood et al. | 219/633 |
| 5,762,726 A * | 6/1998 | Barthel et al. | 148/518 |
| 5,928,530 A * | 7/1999 | Lacourcelle | 219/69.12 |
| 5,961,853 A * | 10/1999 | Thornton | 219/85.14 |
| 6,427,904 B1 * | 8/2002 | Groll | 228/265 |
| 6,635,843 B1 * | 10/2003 | Takeda et al. | 219/105 |
| 6,781,081 B2 * | 8/2004 | Groos et al. | 219/69.12 |
| 6,794,597 B2 * | 9/2004 | Groos et al. | 219/69.12 |
| 6,861,609 B2 * | 3/2005 | Sigler | 219/117.1 |
| 7,041,943 B2 * | 5/2006 | Michelmann | 219/545 |
| 7,126,077 B2 * | 10/2006 | Wang | 219/117.1 |
| 7,723,635 B2 * | 5/2010 | Shin | 219/69.15 |
| 7,969,021 B2 * | 6/2011 | Uno et al. | 257/784 |
| 8,253,062 B2 * | 8/2012 | Forrest et al. | 219/121.64 |
| 8,445,807 B2 * | 5/2013 | Hashizume et al. | 219/69.12 |
| 8,546,729 B2 * | 10/2013 | Derda | 219/203 |
| 8,597,344 B2 * | 12/2013 | Lundkvist et al. | 623/1.22 |
| 8,853,587 B2 * | 10/2014 | Baumann et al. | 219/69.12 |
| 2003/0052113 A1 * | 3/2003 | Saito et al. | 219/145.22 |
| 2005/0000947 A1 * | 1/2005 | Sigler | 219/118 |
| 2005/0029234 A1 * | 2/2005 | Lu et al. | 219/119 |
| 2005/0236373 A1 * | 10/2005 | Hidaka | 219/119 |
| 2005/0247679 A1 * | 11/2005 | Wang | 219/117.1 |
| 2006/0081563 A1 * | 4/2006 | Ueda et al. | 219/119 |
| 2006/0219666 A1 * | 10/2006 | Shin | 219/69.12 |
| 2008/0078749 A1 * | 4/2008 | Sigler et al. | 219/119 |
| 2009/0025959 A1 * | 1/2009 | Tomalin | 174/126.2 |
| 2011/0290531 A1 * | 12/2011 | Baumann et al. | 174/126.2 |

FOREIGN PATENT DOCUMENTS

| | | | | |
|---|---|---|---|---|
| GB | 2 049 524 | | 12/1980 | |
| JP | 06114563 A | * | 4/1994 | B23K 11/16 |
| JP | 2008-137033 | | 6/2008 | |

OTHER PUBLICATIONS

German Office Action issued in corresponding German Patent Application No. 10 2008 020 582.6-34.

* cited by examiner

RESISTANCE WELDING METHOD AND CONDUCTOR UNIT

BACKGROUND OF THE INVENTION (1) Field of the Invention

The present invention relates to a resistance welding method for welding objects to be welded together such as an element wire having a plurality of coating layers and a metal piece and to a conductor unit, which is assembled by welding the objects together using the method.

(2) Description of the Related Art

In order to electrically and mechanically connect (a) an element wire as an object to be welded which includes: a core material coated with an electrically conductive metal on an outer surface thereof; and a plated layer consisting of metal, such as tin, which coats the coated core material, to (b) a metal plate as another object to be welded which includes: a base material consisting of an electrically conductive metal; and a plated layer consisting of metal, such as tin, which is laminated on an outer surface of the base material, so far, for example, brazing using solder is applied or, alternatively, one of the element wire and the metal plate is caulked to the other.

When the objects to be welded together are connected by using solder as described above, the solder reacts with the plated layer to form an intermetallic compound. Because the intermetallic compound generally has low mechanical strength, therefore, when the objects to be welded together are connected by using the solder, a welded part of the objects has low mechanical strength, causing a problem that the welded part of the objects tends to easily separate. This is a reason why such a method using solder is not suitable to connect an electric wire and a terminal fitting, which constitute a wiring harness to be mounted on a motor vehicle as a mobile unit.

On the other hand, in the method using the caulking described above, even when the object (to be welded) having the plated layer on an outer surface thereof is connected to the other object (to be welded), an electrical resistance between the objects tends to increase. Accordingly, the method using the caulking is also not suitable to connect an electric wire and a terminal fitting, which constitute a wiring harness to be mounted on a motor vehicle as a mobile unit.

SUMMARY OF THE INVENTION

It is therefore an objective of the present invention to solve the above problems and to provide a resistance welding method and a conductor unit assembled by welding the objects (to be welded) together using the resistance welding method, by which objects (to be welded together) can be connected without increasing the electrical resistance and with a sufficient mechanical strength, in particular, when the object having the plated layer on an outer surface thereof is being connected to the other object.

In order to attain the above objective, the present invention provides a resistance welding method of welding two objects together including the steps of:

clamping the two objects between a pair of electrodes; and applying a welding current between the pair of the electrodes on a condition that the two objects are pressed to bring the two objects close to each other, so as to allow a contacting surface between the two objects to generate heat, wherein one of the two objects includes a core member and a plated layer, which coats the core member and has a melting point lower than that of a metal constituting an outer surface of the core member, wherein the two objects are clamped between the pair of the electrodes and the contacting surface are allowed to generate heat to melt the plated layer, so as to weld the outer surface of the core member of said one of the two objects and a base member of another of the two objects together, wherein at least the outer surface of the core member and the base member are made of respective metals, between which no intermetallic compound is formed.

With the construction described above, the contacting surface between the two objects is allowed to generate heat to melt the plated layer so as to remove the plated layer from between the outer surface of the core member and the base member. Therefore, the outer surface of the core member directly comes in contact with the base member. Therefore, the electrical resistance between the two objects can be prevented from increasing.

Further, because no intermetallic compound is formed between the outer surface of the core member and the base member, therefore the mechanical strength of the welded part between the outer surface of the core member and the base member can be prevented from deteriorating. That is, the two objects to be welded together can be joined together with sufficient mechanical strength.

The core member includes a core wire and a coating layer, which coats the core wire and constitutes the outer surface of the core member, the core wire being made of a material having a melting point higher than that of the coating layer, wherein the coating layer is made of a metal which forms no intermetallic compound between the metal constituting the coating layer and the base member.

With the construction described above, the core wire does not melt upon welding the coating layer. Therefore, the mechanical strength of the core member can be secured upon the welding. That is, the core member can be prevented from being damaged upon the welding.

In order to attain the above objective, the present invention also provides a conductor unit assembled by means of a resistance welding method of welding two objects together including the steps of:

clamping the two objects between a pair of electrodes; and applying a welding current between the pair of the electrodes on a condition that the two objects are pressed to bring the two objects close to each other, so as to allow a contacting surface between the two objects to generate heat, wherein one of the two objects includes a core member and a plated layer, which coats the core member and has a melting point lower than that of a metal constituting an outer surface of the core member, wherein the plated layer is removed from between the outer surface of the core member of said one of the two objects and a base member of another of the two objects, so that the outer surface of the core member and the base member are welded together, wherein at least the outer surface of the core member and the base member are made of respective metals, between which no intermetallic compound is formed.

With the construction described above, the contacting surface between the two objects is allowed to generate heat to melt the plated layer so as to remove the plated layer from between the outer surface of the core member and the base member. Therefore, the outer surface of the core member directly comes in contact with the base member. Therefore, the electrical resistance between the two objects can be prevented from increasing.

Further, because no intermetallic compound is formed between the outer surface of the core member and the base member, therefore the mechanical strength of the welded part between the outer surface of the core member and the base member can be prevented from deteriorating. That is, the two objects to be welded together are joined together with sufficient mechanical strength.

DESCRIPTION OF EXEMPLARY EMBODIMENTS

In the following, exemplary embodiments of the present invention will be explained with reference to FIGS. 1-8.

Figure 3:
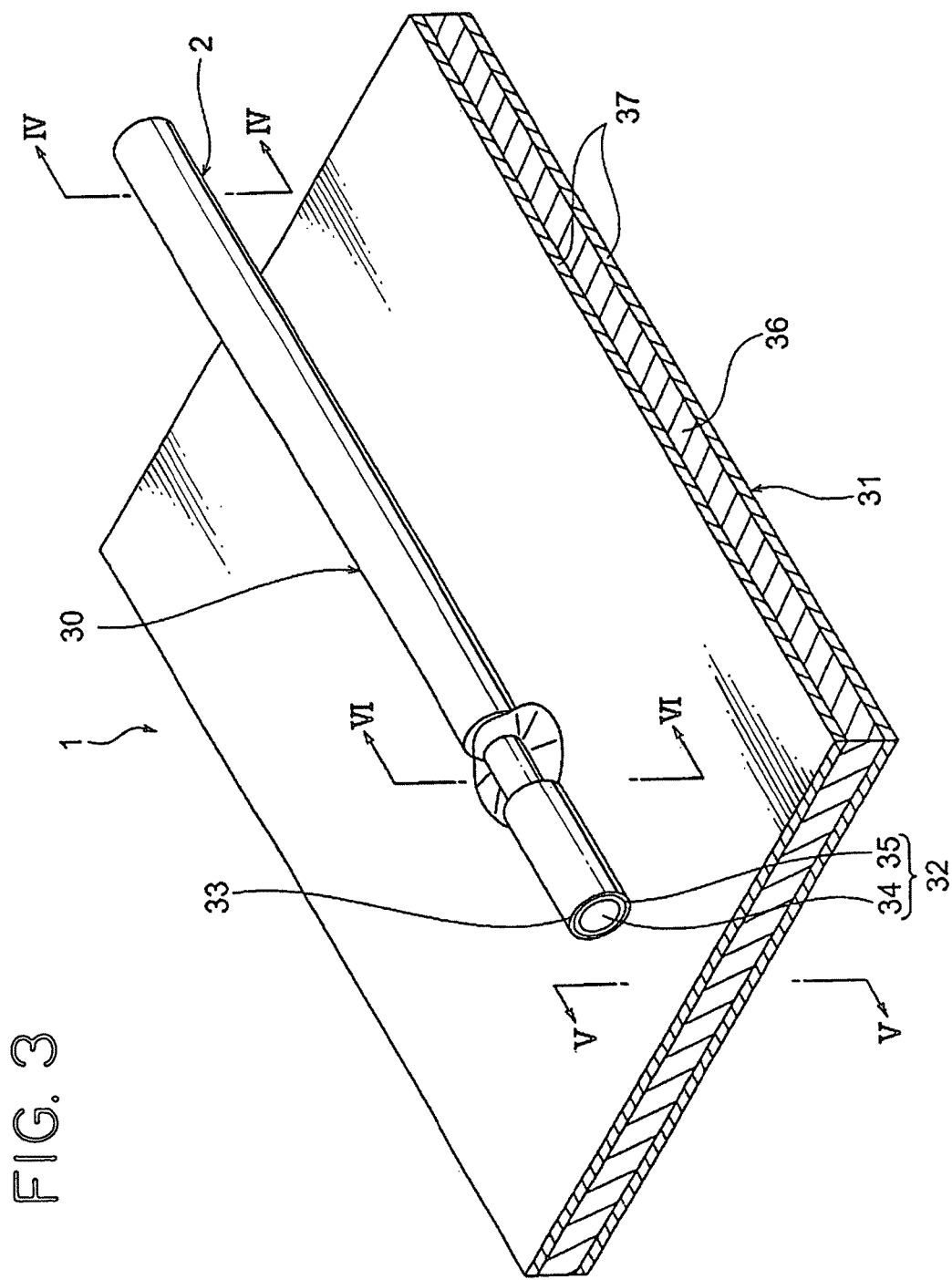
FIG. 3 is a perspective view of a conductor unit assembled by means of the resistance welding method with the resistance welding apparatus shown in FIG. 1.
Figure 4:
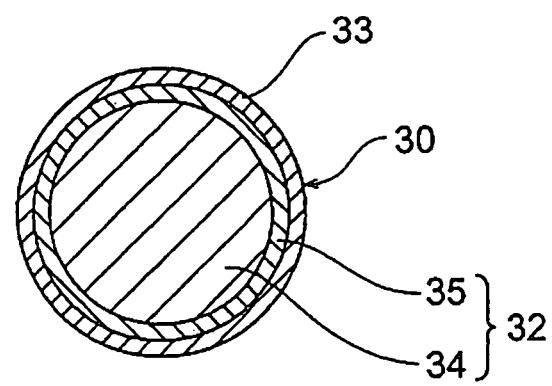
FIG. 4 is a cross sectional view taken along IV-IV line in FIG. 3.

As shown in, FIG. 3, a conductor unit 1 includes an element wire 30 as one of the objects to be welded together and a metal plate 31 as another of the objects. As shown in FIG. 4, the element wire 30 includes a core member 32 and a plated layer 33 which coats the core member 32. The core member 32 is formed as a long wire having a round shape in section. As shown in FIG. 4, the core member 32 includes a core wire 34 and a coating layer 35 which coats the core wire 34.

The core wire 34 is made of metal or non-metal and formed as a long wire having a round shape in section. The core wire 34 is preferably made of a material having sufficient mechanical strength higher than that of the coating layer 35. The core wire 34 improves the mechanical strength of the core member 32. Of course, the core wire 34 may be made of a material having electrically conductive property or, alternatively, a material having no electrically conductive property. The core wire 34 is made of a material having a melting point higher than that of the coating layer 35. In an example shown in the figure, the core wire 34 is made of iron.

The coating layer 35 is made of a material (metal) having high electrical conductivity including an element such as copper, silver, gold, aluminum or magnesium. The coating layer 35 is made of a metal having a melting point higher than that of the plated layer 33 and lower than that of the core wire 34. The coating layer 35 coats an outer surface of the core wire 34 throughout the entire length of the core wire 34. A thickness of the coating layer 35 is constant in a circumferential direction and a longitudinal direction of the core wire 34. In an example shown in the figure, the coating layer 35 is made of copper and has a thickness of 30-40 µm. The coating layer 35 constitutes the outer surface of the core member 32.

The plated layer 33 is made of a metal, such as tin, zinc or solder, having a melting point lower than those of the metal constituting the core wire 34 and the metal constituting the coating layer 35. That is, the element wire 30 includes the core member 32 and the plated layer 33, which coats the core member and has a melting point lower than that of the metal constituting the outer surface (i.e. the coating layer 35) of the core member 32. The plated layer 33 coats the outer surface of the core member 32, that is, the coating layer 35 throughout the entire length of the core member 32. A thickness of the plated layer 33 is constant in the circumferential direction and in the longitudinal direction of the core member 32. In an example shown in the figure, the plated layer 33 is made of tin and has a thickness of 8 µm.

The element wire 30 described above has an outer diameter of about 0.8 mm.

Figure 5:
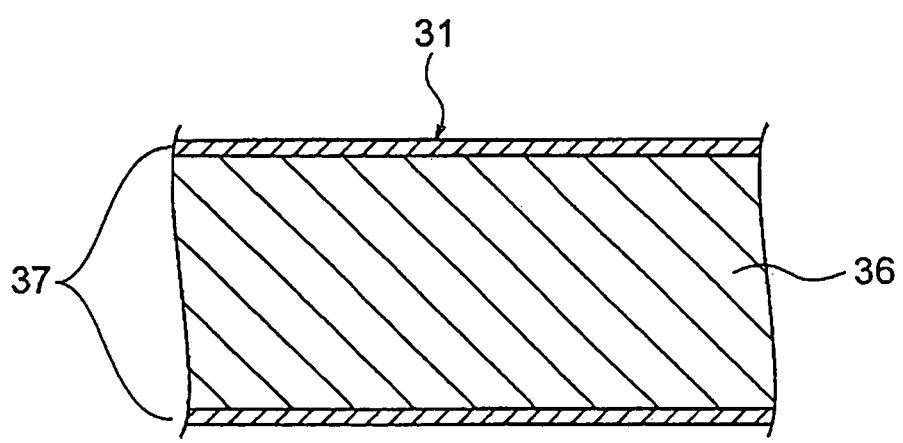
FIG. 5 is a cross sectional view taken along V-V line in FIG. 3.

The metal plate 31 as a whole is formed in a flat plate-shape. As shown in FIG. 5, the metal plate 31 includes a flat plate-shaped base member 36 having a constant thickness and surface layers 37 laminated on both outer surfaces of the base member 36. The base member 36 is made of a material (metal) having high electrical conductivity including an element such as copper, silver, gold, aluminum or magnesium. The base member 36 is made of a metal having a melting point higher than that of the surface layer 37. In an example shown in the figure, the base member is made of copper alloy.

The surface layer 37 is made of a metal, such as tin, having a melting point lower than those of the metal constituting the core wire 34, the metal constituting the coating layer 35 and the metal constituting the base member 36. That is, the metal plate 31 includes the base member 36 and the surface layers 37, which are laminated on both outer surfaces of the base member 36 and have a melting point lower than that of the metal constituting the base member 36. The surface layer 37 is laminated on the outer surface of the base member 36 with a constant thickness throughout the entire base member 36. In the example shown in the figure, the surface layer 37 is made of tin having a thickness of 0.8-1.5 µm.

The metal plate 31 having the structure described above has a thickness of about 0.8 mm.

Figure 6:
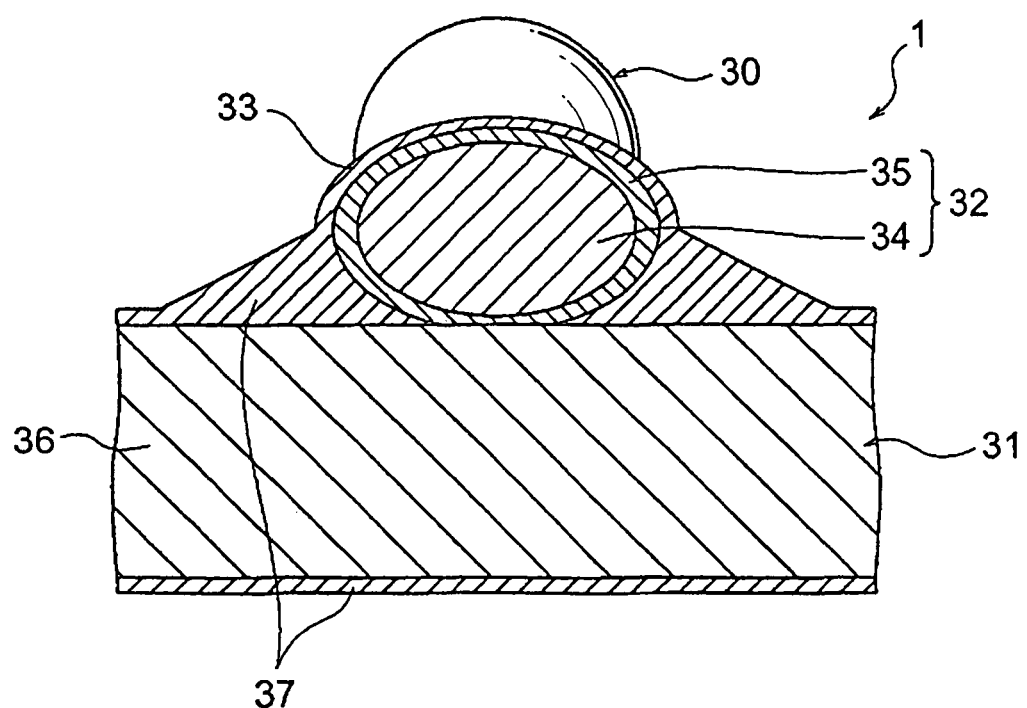
FIG. 6 is a cross sectional view taken along VI-VI line in FIG. 3.

As shown in FIG. 6, as for the conductor unit 1, in the welded part between the element wire 30 and the metal plate 31, (a) the coating layer 35 of the core member 32, i.e. the outer surface of the core member 32 of the element wire 30 and (b) the base member 36 of the metal plate 31 are welded together, and the plated layer 33 and the surface layer 37 are removed from between (a) the coating layer 35 of the core member 32, i.e. the outer surface of the core member 32 of the element wire 30 and (b) the base member 36 of the metal plate 31.

Here, (a) the coating layer 35 of the core member 32, i.e. the outer surface of the core member 32 of the element wire 30 and (b) the base member 36 of the metal plate 31 are made of metals, between which no intermetallic compound is formed when the coating layer 35 (i.e. the outer surface) of the core member 32 and the base member 36 are welded together by means of the resistance welding method. Preferably, (a) the coating layer 35 of the core member 32, i.e. the outer surface of the core member 32 of the element wire 30 and (b) the base member 36 of the metal plate 31 are made of the same metal.

Figure 1:
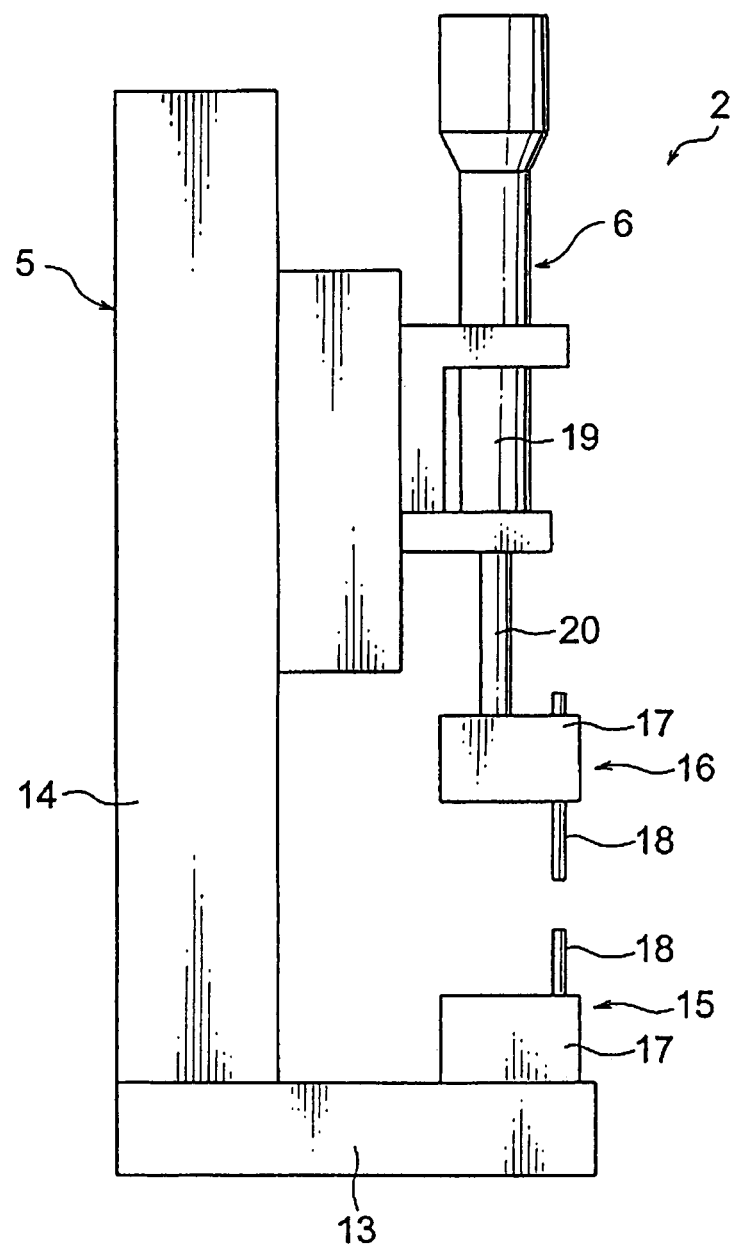
FIG. 1 shows a construction of a body of a resistance welding apparatus which performs a resistance welding method according to a preferred embodiment of the present invention.
Figure 2:
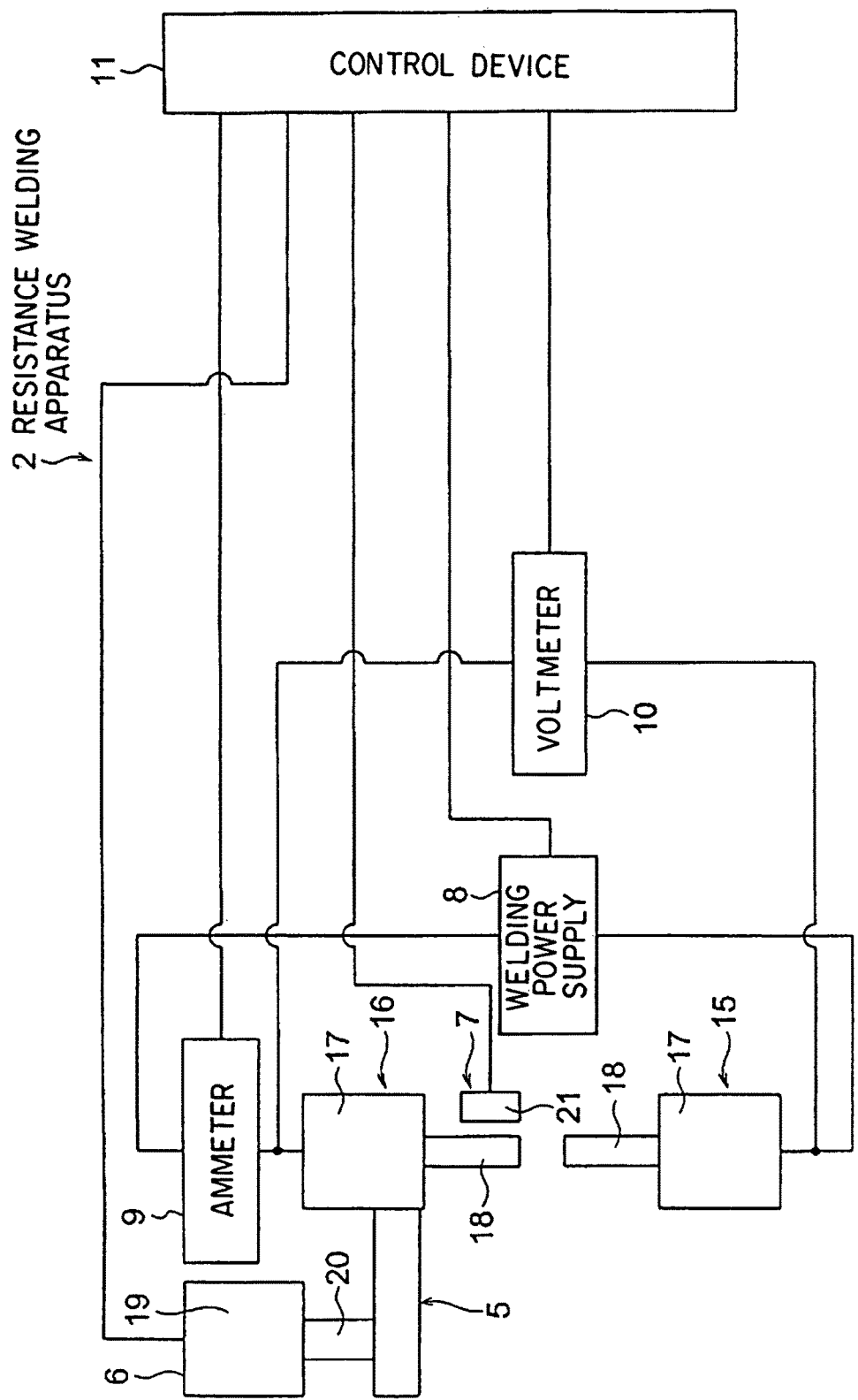
FIG. 2 is a block diagram of the construction of the resistance welding apparatus shown in FIG. 1.

The conductor unit 1 having the structure described above is obtained by welding the element wire 30 as one object (to be welded) and the metal plate 31 as another object (to be welded) together by using a resistance welding apparatus 2 (shown in FIGS. 1 and 2).

As shown in FIG. 2, the resistance welding apparatus 2 includes an apparatus body 5 (shown in FIG. 1), cylinder 6, linear encoder 7 as a displacement measuring means, welding power supply 8, ammeter 9 as a current value measuring means, voltmeter 10 as a voltage value measuring means, and control device 11.

As shown in FIG. 1, the apparatus body 5 includes a base plate 13, rising-up plate 14 rising up from the base plate 13, and a pair of electrodes 15 and 16. The base plate 13 is formed in a thick flat plate-shape and placed on a floor of a plant or the like. The rising-up plate 14 rises upward from the base plate 13.

Each of the electrodes 15 and 16 is provided with a holder 17 and an electrode body 18. The electrode body 18 is formed in a bar-shape and attached to the holder 17. The holder 17 of one electrode 15 is fixed on the base plate 13, rising upward from the base plate 13. The electrode body 18 of the one electrode 15 is attached to the holder 17, rising upward along the vertical direction from the holder 17. Alternatively, the electrode body 18 of the one electrode 15 may extend along the horizontal direction from the holder 17.

The holder 17 of another electrode 16 is attached to a rod 20 (explained later) of the cylinder 6 in such a manner that the electrode body 18 of the one electrode 15 and the electrode body 18 of the other electrode 16 face each other along the vertical direction. The electrode body 18 of the other electrode 16 is attached to the holder 17, rising downward along the vertical direction from the holder 17. Alternatively, the electrode body 18 of the other electrode 16 may extend along the horizontal direction from the holder 17.

As for the pair of the electrodes 15 and 16, the electrode bodies 18 approach each other when the rod 20 of the cylinder 6 extends, while the electrode bodies 18 leave each other when the rod 20 of the cylinder 6 shrinks. That is, the electrode bodies 18 of the pair of the electrodes 15 and 16 approach and leave each other when the rod 20 of the cylinder 6 extends and shrinks, respectively.

As shown in FIGS. 1 and 2, the cylinder 6 includes a cylinder body 19 and the rod 20 stretchable from the cylinder body 19. The cylinder body 19 is attached to the rising-up plate 14 in such a manner that a longitudinal direction of the rod 20 extends along the vertical direction and the rod 20 extends downward from the cylinder body 19. As for the cylinder 6, the rod 20 extends and shrinks from the cylinder body 19 when, for example, pressurized gas is supplied into the cylinder body 19. When the rod 20 extends and shrinks from the cylinder body 19, the cylinder 6 allows the electrode bodies 18 of the pair of the electrodes 15 and 16 to approach and leave each other.

As shown in FIG. 2, the linear encoder 7 includes a detector 21. The detector 21 detects an amount of movement in the vertical direction of a scale tape (not shown) stuck to the electrode body 18 of the electrode 16, which is attached to the rod 20 of the cylinder 6. Thus, the linear encoder 7 or the detector 21 detects displacement of the electrode 16 in the direction in which the pair of the electrodes 15 and 16 approaches and leaves each other. That is, the linear encoder 7 or the detector 21 detects a distance, by which the pair of the electrodes 15 and 16 approaches each other during the welding between the element wire 30 and the metal plates 31 as the objects to be welded, i.e. detects the displacement of the electrode 16. The linear encoder 7 outputs the distance, by which the pair of the electrodes 15 and 16 approaches each other during the welding between the element wire 30 and the metal plates 31 as the objects to be welded, i.e. outputs the displacement of the electrode 16 to the control device 11.

As shown in FIG. 2, the welding power supply 8 is connected (i.e. electrically connected) to the control device 11 and applies a welding current to between the pair of the electrodes 15 and 16 based on a command from the control device 11. The welding power supply 8 may or may not change a current value of the welding current based on the command from the control device 11.

As shown in FIG. 2, the ammeter 9 is connected to the welding power supply 8 and the electrode 16, and arranged between the welding power supply 8 and the electrode 16. The ammeter 9 is also connected to the control device 11. The ammeter 9 measures a current value of the welding current and outputs the measured current value to the control device 11.

As shown in FIG. 2, the voltmeter 10 is connected to both of the pair of the electrodes 15 and 16. The voltmeter 10 is also connected to the control device 11. The voltmeter 10 measures a voltage value between the pair of the electrodes 15 and 16 when the welding current is applied therebetween and outputs the measured voltage value to the control device 11.

The control device 11 is a computer which includes a known RAM, ROM, CPU and so on. The control device 11 is connected to the cylinder 6, linear encoder 7, welding power supply 8, ammeter 9 and voltmeter 10 so as to control the whole of the resistance welding apparatus 2. When the element wire 30 and the metal plate 31 are clamped between the pair of the electrodes 15 and 16, the control device 11 permits the cylinder 6 to press the element wire 30 and the metal plate 31 with predetermined force in a direction in which the element wire 30 and the metal plate 31 approach each other.

Then, the control device 11 permits the welding power supply 8 to apply a welding current between the electrodes 15 and 16. Then, the control device 11 keeps a current value of the welding current being a predetermined value on the basis of a current value from the ammeter 9. The control device 11 resistance-welds the coating layer 35, i.e. the outer surface of the core member 32 and the base member 36 together with predetermined quality on the basis of a current value from the ammeter 9, a voltage value from the voltmeter 10 and a movement distance of the electrode 16 from the linear encoder 7, thereby assembling the conductor unit 1.

Figure 7:
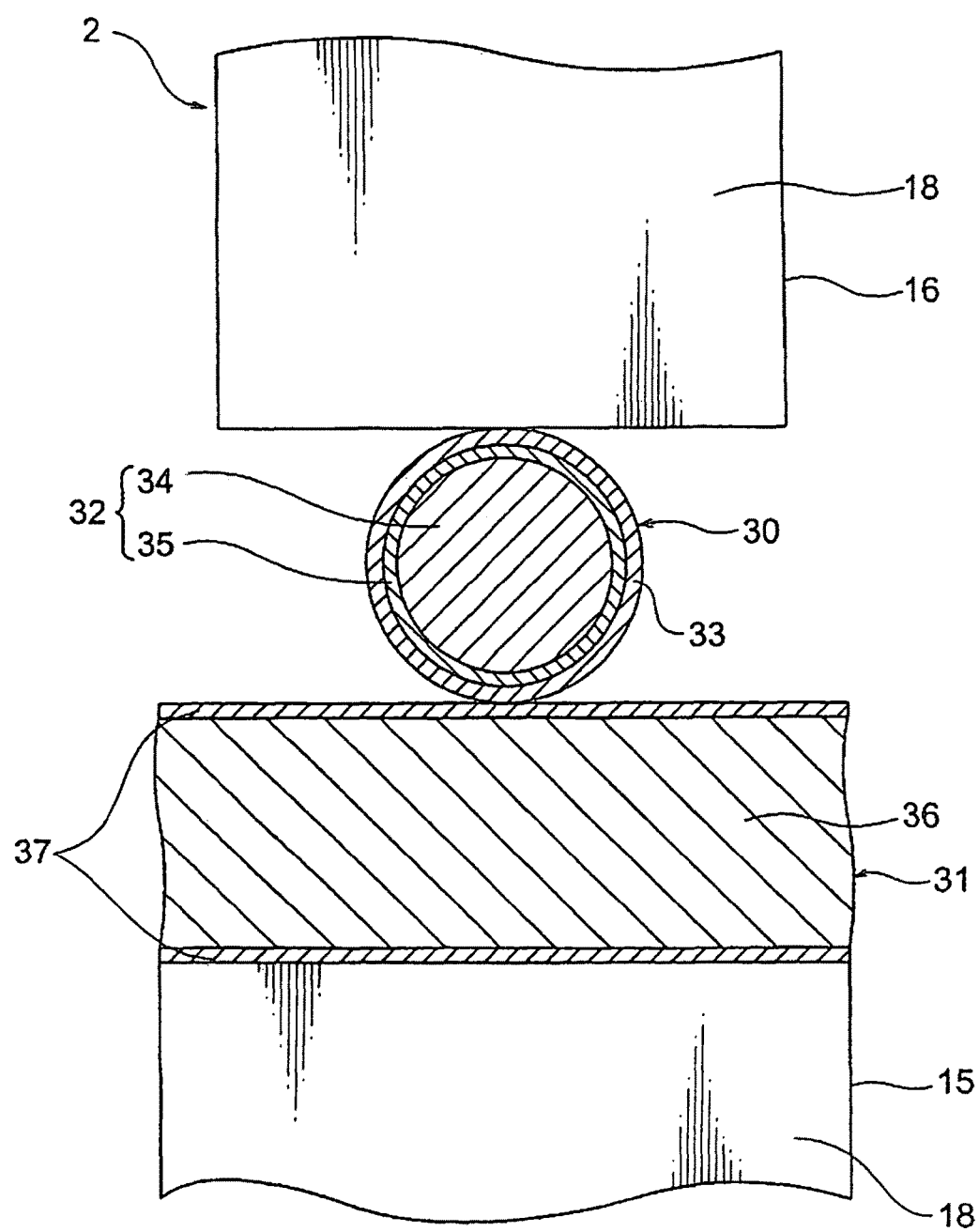
FIG. 7 is a cross sectional view illustrating a state when an element wire and a metal plate before welding of the conductor unit shown in FIG. 3 are clamped between a pair of electrodes.

When the core member 32 of the element wire 30 and the base member 36 of the metal plate 31 are being resistance-welded, first, as shown in FIG. 7, the element wire 30 is placed on the metal plate 31 and then, the element wire 30 and the metal plate 31 are clamped between the electrodes 15 and 16. In an example shown in the figure, the metal plate 31 is positioned on the electrode 15, the element wire 30 is positioned on the metal plate 31, and the electrode 16 is positioned on the element wire 30.

Thereafter, the control device 11 permits the rod 20 of the cylinder 6 to extend so as to press the pair of the electrodes 15 and 16 with a desired load value (i.e. pressure) in a direction in which the electrodes 15 and 16 approach each other and then, permits the welding power supply 8 to apply a welding current between the pair of the electrodes 15 and 16. As a result, the welding current flows between the pair of the electrodes 15 and 16, so that a part of the outer surface of the surface layer 37 of the metal plate 31 and a part of the outer surface of the plated layer 33 of the element wire 30, which come in contact with each other, generate heat.

Thereby, the plated layer 33 and the surface layer 37, which are put between a part of the core member 32 and a part of the base member 36, which parts are clamped between the electrodes 15 and 16, melt. Because the pair of the electrodes 15 and 16 is pressed in the direction in which the electrodes 15 and 16 approach each other by the cylinder 6, therefore the electrodes 15 and 16 gradually approach each other, so that the molten plated layer 33 and the molten surface layer 37 are removed from between the part of the core member 32 and the part of the base member 36, which parts are clamped between the electrodes 15 and 16, and climb on the neighboring plated layer 33 and the neighboring surface layer 37. At that time, because the melting points of the core wire 34 of the core member 32, the coating layer 35 and the base member 36 are higher than those of the plated layer 33 and the surface layer 37, therefore the core wire 34 of the core member 32, the coating layer 35 and the base member 36 are not molten.

Figure 8:
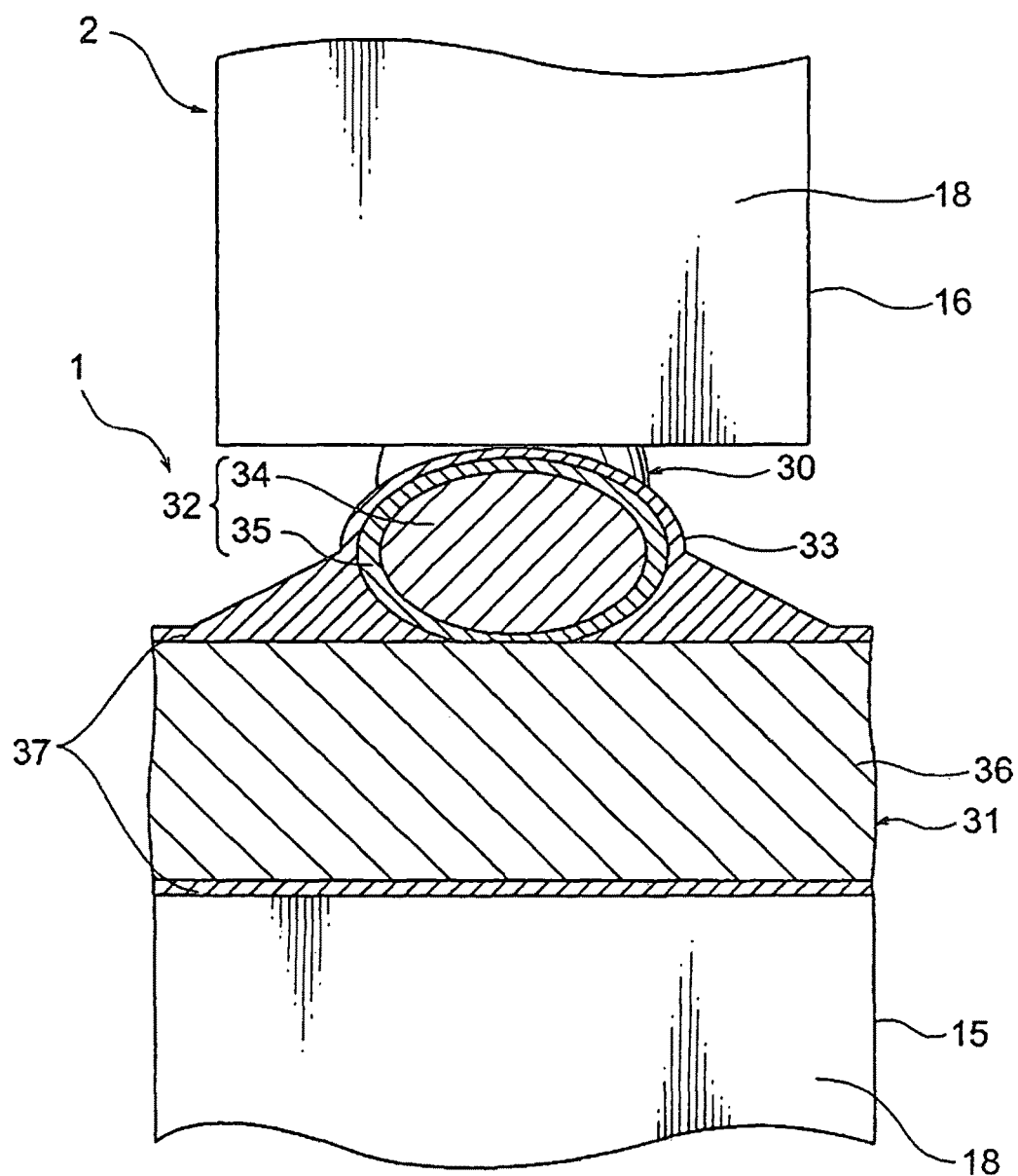
FIG. 8 is cross sectional view illustrating a state when the element wire and the metal plate shown in FIG. 7 are welded together.

Then, as shown in FIG. 8, the core member 32 and the base member 36, which are clamped between the electrodes 15 and 16, are allowed to come in contact with each other, so that the core member 32. and the base member 36 are welded together (i.e. resistance-welded together). After the control device 11 allows the welding current to flow until the plated layer 33 and the surface layer 37 come in contact with each other so as to be welded together on a condition that the plated layer 33 and the surface layer 37 are made molten while the core member 32 and the base member 36 are not made molten, the control device 11 halts the resistance welding. Thus, the outer surface of the core member 32, i.e. the coating layer 35 of the element wire 30 and the base member 36 of the metal plate 31 are welded (i.e. resistance-welded) together, thereby assembling the conductor unit 1.

According to an exemplary embodiment described above, a part of the outer surface of the plated layer 33 and a part of the outer surface of the surface layer 37 as the contacting surface between the element wire 30 and the metal plate 31 are allowed to generate heat to melt the plated layer 33 so as to remove the plated layer 33 from between the coating layer 35 as the outer surface of the core member 32 and the base member 36 of the metal plate 31. Therefore, the coating layer 35 as the outer surface of the core member 32 directly comes in contact with the base member 36 of the metal plate 31. Therefore, the electrical resistance between the element wire 30 and the metal plate 31 can be prevented from increasing.

Further, because no intermetallic compound is formed between the coating layer 35 as the outer surface of the core member 32 and the base member 36 of the metal plate 31, therefore the mechanical strength of the welded part between the coating layer 35 as the outer surface of the core member 32 and the base member 36 of the metal plate 31 can be prevented from deteriorating. That is, the element wire 30 and the metal plate 31 can be joined together with sufficient mechanical strength. Accordingly, the element wire 30 and the metal plate 31 can be welded together in such a manner that the high mechanical strength and low electrical resistance sufficient enough to construct a wiring harness to be mounted on a motor vehicle as a mobile unit can be attained. That is, a conductor unit 1 suitable to construct a wiring harness to be mounted on a motor vehicle as a mobile unit can be obtained.

Because the core member 32 includes the core wire 34 having a melting point higher than that of the coating layer 35, therefore the core wire 34 does not melt upon welding the coating layer 35. Therefore, the mechanical strength of the core member 32 can be secured upon the welding. That is, the core member 32 can be prevented from being damaged upon the welding and therefore, the core member 32 can be welded to the metal plate 31 without being damaged.

Further, when a part of the outer surface of the plated layer 33 and a part of the outer surface of the surface layer 37 as the contacting surface between the element wire 30 and the metal plate 31 are allowed to generate heat, in addition to the plated layer 33, the surface layer 37 of the metal plates 31 is allowed to melt and removed from between the coating layer 35 as the outer surface of the core member 32 and the base member 36 of the metal plate 31. Therefore, the coating layer 35 as the outer surface of the core member 32 securely directly comes in contact with the base member 36 of the metal plate 31. Therefore, the electrical resistance between the element wire 30 and the metal plate 31 can be securely prevented from increasing.

In the exemplary embodiment described above, the core member 32 includes the core wire 34 and the coating layer 35. However, instead, in the present invention, the core member 32 may include a single layer, that is, only the core wire 34 is provided such that the outer surface of the core member 32 is made of metal having a melting point higher than that of the plated layer 33. Alternatively, the core member 32 may include more than two layers. In short, in the present invention, it is necessary to fulfill that at least the outer surface of the core member 32 is made of metal which does not form any intermetallic compound with the base member 36 of the metal plate 31.

In the exemplary embodiment described above, the coating layer 35 (i.e., the outer surface) of the core member 32 and the base member 36 of the metal plate 31 are made of the same metal. However, instead, in the present invention, the coating layer 35 (i.e., the outer surface) of the core member 32 and the base member 36 of the metal plate 31 may be made of respective metals different from each other provided that the coating layer 35 (i.e., the outer surface) of the core member 32 and the base member 36 of the metal plate 31 do not form any intermetallic compound therebetween with the heat generated upon the resistance welding.

For example, one of the coating layer 35 (i.e., the outer surface) of the core member 32 and the base member 36 of the metal plate 31 may be made of Cu, while another thereof may be made of Li, Mn, Ni, Pb, Pd, Pt or Ag. Alternatively, one of the coating layer 35 (i.e., the outer surface) of the core member 32 and the base member 36 of the metal plate 31 may be made of Ag, while another thereof may be made of Au, Bi, Cu, Ge, Na, Ni, Pb, Pd, Si or Tl. Alternatively, one of the coating layer 35 (i.e., the outer surface) of the core member 32 and the base member 36 of the metal plate 31 may be made of Au, while another thereof may be made of Ag, Ge, Pb, Si or Tl. Alternatively, one of the coating layer 35 (i.e., the outer surface) of the core member 32 and the base member 36 of the metal plate 31 may be made of Al, while another thereof may be made of Be, Bi, Ga, Ge, In, Si or Sn.

Further, in the present invention, the surface layer 37 may not be formed on the outer surface of the metal plate 31. The plated layer 33 and the surface layer 37 may be made of various metals other than tin. The other object to be welded may have various shapes other than the flat plate-shape.

The aforementioned exemplary embodiments are described to aid in understanding the present invention and variations may be made by one skilled in the art without departing from the spirit and scope of the present invention.

What is claimed is:

1. A resistance welding method of welding two objects together comprising the steps of:
    clamping the two objects between a pair of electrodes; and
    applying a welding current between the pair of the electrodes on a condition that the two objects are pressed to bring the two objects toward each other,
    heating a contacting surface between the two objects,
    wherein one of the two objects includes a core member and a plated layer, which coats the core member and has a melting point lower than that of a coating layer that is a metal constituting an outer surface of the core member,
    wherein the two objects are clamped between the pair of the electrodes and the contacting surface is allowed to generate heat to melt the plated layer, and to weld the coating layer of said one of the two objects and a base member of another of the two objects together,
    wherein the core member includes a core wire and the coating layer, which coats the core wire, the core wire having a round shape in section and being made of a material having a melting point higher than that of the coating layer and also being made of a material having mechanical strength higher than that of the coating layer, and
    wherein the coating layer is made of a metal which forms no intermetallic compound between the metal constituting the coating layer and the base member when the coating layer and a the base member are welded or the coating layer is made by a method in which the intermetallic compound is not produced when the coating layer joins the base member.

2. A conductor unit having no intermetallic compound in a welding interface,
    wherein one of two objects includes a core member and a plated layer, which coats the core member and has a melting point lower than that of a coating layer constituting an outer surface of the core member,
    wherein the plated layer is removed by melting from between the coating layer of said one of two objects and a base member of another of the two objects, so that the coating layer and the base member are welded together,
    wherein the core member includes a core wire and the coating layer, which coats the core wire, the core wire having a round shape in section and being made of a material having a melting point higher than that of the coating layer and also being made of a material having mechanical strength higher than that of the coating layer, and
    wherein the coating layer is made of a metal which forms no intermetallic compound between the metal constituting the coating layer and the base member when the coating layer and the base member are welded or the coating layer is made by a method in which the intermetallic compound is not produced when the coating layer joins the base member.

3. The resistance welding method of welding two objects together according to claim 1, wherein the two objects can be connected without increasing the electrical resistance and with a sufficient mechanical strength.

* * * * *